United States Patent
Muzina et al.

(10) Patent No.: US 8,386,173 B2
(45) Date of Patent: Feb. 26, 2013

(54) ADJUSTING A LEVEL OF MAP DETAIL DISPLAYED ON A PERSONAL NAVIGATION DEVICE ACCORDING TO DETECTED SPEED

(75) Inventors: Hrvoje Muzina, Auckland (NZ); Hayden James Rosser, Auckland (NZ)

(73) Assignee: Mitac International Corp., Kuei-Shan Hsiang, Tao-Yuan Hsien (TW)

( * ) Notice: Subject to any disclaimer, the term of this patent is extended or adjusted under 35 U.S.C. 154(b) by 527 days.

(21) Appl. No.: 12/684,974

(22) Filed: Jan. 11, 2010

(65) Prior Publication Data

US 2011/0172917 A1    Jul. 14, 2011

(51) Int. Cl.
 *G01C 21/10*    (2006.01)

(52) U.S. Cl. ......... 701/455; 701/26; 701/457; 345/428; 345/661

(58) Field of Classification Search ............... 701/23–28, 701/212, 400, 408–410, 430, 450, 454, 455, 701/457; 345/419, 428, 173, 600, 660–662
See application file for complete search history.

(56) References Cited

U.S. PATENT DOCUMENTS

| | | | |
|---|---|---|---|
| 5,539,397 A * | 7/1996 | Asanuma et al. | 340/901 |
| 5,848,373 A | 12/1998 | DeLorme et al. | |
| 6,529,822 B1 * | 3/2003 | Millington et al. | 701/410 |
| 7,636,631 B2 * | 12/2009 | Shimizu et al. | 701/437 |
| 8,032,298 B2 * | 10/2011 | Han | 701/455 |
| 8,237,744 B2 * | 8/2012 | Joachim et al. | 345/660 |
| 2007/0236475 A1 * | 10/2007 | Wherry | 345/173 |
| 2009/0046111 A1 | 2/2009 | Joachim | |
| 2009/0109216 A1 * | 4/2009 | Uetabira | 345/419 |
| 2011/0029227 A1 * | 2/2011 | Geelen et al. | 701/200 |
| 2011/0106431 A1 * | 5/2011 | Tomobe et al. | 701/201 |

FOREIGN PATENT DOCUMENTS

| | | |
|---|---|---|
| DE | 195 37 255 A1 | 4/1996 |
| DE | 100 27 516 A1 | 12/2001 |
| DE | 103 13 223 A1 | 10/2004 |
| DE | 10 2005 049 761 A1 | 4/2007 |
| JP | 63073111 A | 4/1988 |
| JP | 08234656 A | 9/1996 |
| TW | I257591 | 7/2006 |

* cited by examiner

*Primary Examiner* — Russell Frejd
(74) *Attorney, Agent, or Firm* — Winston Hsu; Scott Margo

(57) ABSTRACT

A method of adjusting a level of map detail for content displayed on a personal navigation device includes displaying a map of a current location of the personal navigation device on a display of the personal navigation device, calculating a current speed of the personal navigation device, adjusting a level of map detail according to the current speed of the personal navigation device to create an updated map, and displaying the updated map on the display of the personal navigation device.

14 Claims, 3 Drawing Sheets

| Speed | Level of map detail |
|---|---|
| Speed < Th1 | Full 3D |
| Th1 ≦ Speed < Th2 | 3D with building outlines |
| Th2 ≦ Speed < Th3 | Full 2D |
| Th3 ≦ Speed < Th4 | 2D with reduced number of POIs |
| Th4 ≦ Speed < Th5 | 2D with reduced number of colors |
| Th5 ≦ Speed < Th6 | 2D with reduced number of streets |

FIG. 2

ADJUSTING A LEVEL OF MAP DETAIL DISPLAYED ON A PERSONAL NAVIGATION DEVICE ACCORDING TO DETECTED SPEED

BACKGROUND OF THE INVENTION

1. Field of the Invention

The invention relates to a method of display map data on a personal navigation device, and more particularly, to a method and related device for adjusting a level of map detail shown on the personal navigation device according to a current speed of the personal navigation device.

2. Description of the Prior Art

Global Positioning System (GPS) based navigation devices are well known and are widely employed as in-car navigation devices. Common functions of a navigation device include providing a map database for generating navigation instructions that are then shown on a display of the navigation device. These navigation devices are often mounted on or in the dashboard of a vehicle using a suction mount or other mounting means.

The term "navigation device" refers to a device that enables a user to navigate to a pre-defined destination. The device may have an internal system for receiving location data, such as a GPS receiver, or may merely be connectable to a receiver that can receive location data. The device may compute a route itself, or communicate with a remote server that computes the route and provides navigation information to the device, or a hybrid device in which the device itself and a remote server both play a role in the route computation process. Personal GPS navigation devices are not permanently integrated into a vehicle but instead are devices that can readily be mounted in or otherwise used inside a vehicle. Generally (but not necessarily), they are fully self-contained—i.e. include an internal GPS antenna, navigation software and maps and can hence plot and display a route to be taken.

Personal navigation devices typically provide two-dimensional maps for helping users to navigate to a destination. However, three-dimensional (3D) maps are useful in certain situations as well. For instance, when a pedestrian is holding a personal navigation device, a 3D map showing realistic views of buildings is useful for helping the pedestrian find his way around a city since he can use the buildings as landmarks for helping to navigate. When driving in a car, however, 3D maps can obscure the map view by covering up the upcoming roads and points of interest. In this case, two-dimensional (2D) maps are usually preferred over 3D maps.

Therefore, there is a need for a convenient way of switching between different types of maps, such as 2D and 3D maps depending on how the personal navigation device is being used.

SUMMARY OF THE INVENTION

It is therefore one of the primary objectives of the claimed invention to provide a method and related device for adjusting the level of map detail displayed on a personal navigation device according to a detected speed of the personal navigation device.

According to an exemplary embodiment of the claimed invention, a method of adjusting a level of map detail for content displayed on a personal navigation device is disclosed. The method includes displaying a map of a current location of the personal navigation device on a display of the personal navigation device, calculating a current speed of the personal navigation device, adjusting a level of map detail according to the current speed of the personal navigation device to create an updated map, and displaying the updated map on the display of the personal navigation device.

According to another exemplary embodiment of the claimed invention, a personal navigation device for adjusting a level of map detail for content displayed on a personal navigation device is disclosed. The personal navigation device includes a display for displaying a map of a current location of the personal navigation device, a Global Positioning System (GPS) receiver for receiving the current location of the personal navigation device, and a memory for storing map data. The personal navigation device also contains a processor for calculating a current speed of the personal navigation device, adjusting a level of map detail according to the current speed of the personal navigation device to create an updated map, and controlling the display to display the updated map.

It is an advantage that the present invention provides a way to automatically adjust the level of map detail shown on the personal navigation device so that users can see more detail when it is useful at slower speeds and see less detail when driving at high speeds. In this way, the present invention shows a level of map detail that is appropriate for the way that the personal navigation device is being used. Pedestrians and slow moving vehicles can make use of 3D views, whereas fast moving cars can utilize a simple and uncluttered 2D view.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 shows an example of data stored in a lookup table.

DETAILED DESCRIPTION

The present invention provides a way to automatically adjust the map information displayed on a personal navigation device. The personal navigation device can zoom in on a map when moving at slow speeds, and can zoom out when moving at fast speeds. In addition, 3D maps can be shown at slower speeds, while 2D maps can be shown at faster speeds, with the maps becoming simpler and less cluttered as the driving speed increases.

Figure 1:
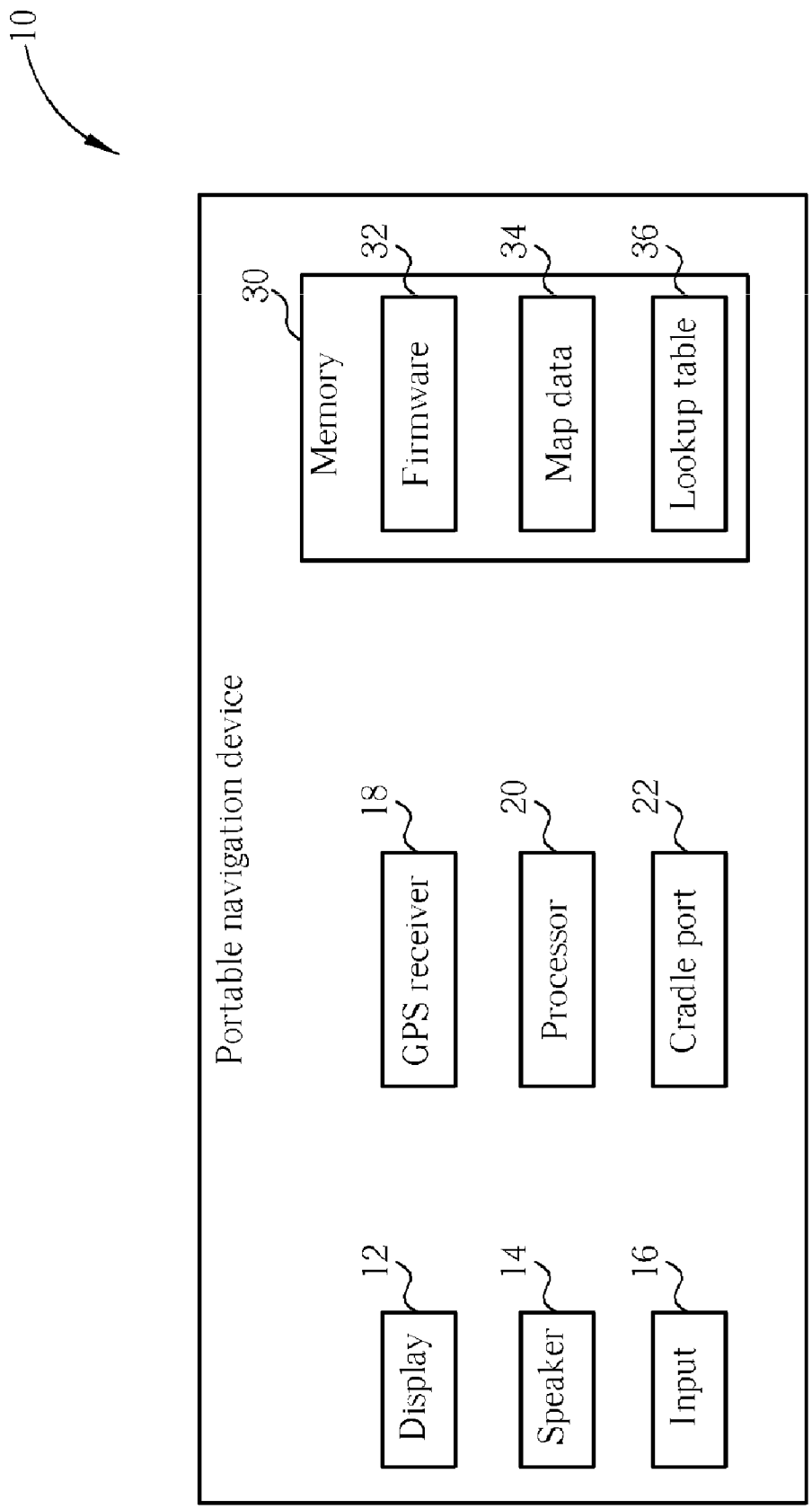
FIG. 1 is a block diagram of a personal navigation device according to the present invention.

Please refer to FIG. 1. FIG. 1 is a block diagram of a personal navigation device 10 according to the present invention. The personal navigation device 10 contains a display 12 for showing map and route data to a user, a speaker 14 for outputting audible alerts to the user, and input 16 such as control buttons and a touch-screen. The personal navigation device 10 also contains a GPS receiver 18 for receiving the current location of the personal navigation device 10 such as the latitude and longitude coordinates. A processor 20 controls operation of the personal navigation device 10 and executes firmware 32 stored in a memory 30 of the personal navigation device 10. A cradle port 22 is used for connecting the personal navigation device 10 to a cradle installed in a vehicle. The cradle can provide power to the personal navigation device 10 and optionally provide other information about the vehicle to the personal navigation device 10 through the cradle port 22. The memory 30 also stores map data 34 as well as a lookup table 36 storing a plurality of speed thresholds and corresponding levels of map detail that will be shown on the display 12. The processor 20 can calculate the current speed at which the personal navigation device 10 is moving by tracking the change in position supplied by the GPS receiver 18 over time.

Please refer to FIG. 2. FIG. 2 shows an example of data stored in the lookup table 36. A left column of the lookup table 36 contains speed ranges defined by six different speed thresholds Th1, Th2, Th3, Th4, Th5, and Th6. A right column of the lookup table 36 contains levels of map detail that correspond to the speed ranges. Please keep in mind that the information shown in the lookup table 36 of FIG. 2 is shown as an example only, and the specific data shown as well as the relative order of the data can be altered. The contents of the lookup table 36 will now be briefly described. When the speed of the personal navigation device 10 is less than a first threshold value Th1, the level of map detail shown on the display 12 is a full 3D view of area in front of the user. Thus, buildings and other structures will appear in 3D and the user will be able to compare the pictures of the buildings shown on the display 12 to the actual buildings on the ground in order to gain his bearings and navigate more efficiently. The personal navigation device 10 moving at a slow speed less than the first threshold value Th1 can result from the user carrying the personal navigation device 10 when walking as a pedestrian, in which case the 3D view is helpful for the pedestrian. When the personal navigation device 10 is located in a vehicle, the 3D view can also be used when the vehicle is moving at a slow speed less than the first threshold value Th1 or when the vehicle is stopped or parked. In these instances, the 3D view can also be useful for navigating the area.

Continuing with the lookup table 36, a second speed range is met when the speed of the personal navigation device 10 is greater than or equal to the first threshold Th1 but less than a second threshold Th2. In this case, the level of map detail can show a 3D view of the area with buildings shown in outline form instead of the whole building being shown and blocking areas behind the building. When building outlines or translucent images of the buildings used, users can still see behind the buildings and can better see locations that the user is approaching. A third speed range is satisfied when the speed of the personal navigation device 10 is greater than or equal to the second threshold Th2 but less than a third threshold Th3. In this case, the level of map detail can show a full 2D representation of the map without any 3D buildings obstructing the view of the map.

A fourth speed range is satisfied when the speed of the personal navigation device 10 is greater than or equal to the third threshold Th3 but less than a fourth threshold Th4. In this case, the level of map detail can show a 2D map with fewer points of interest (POIs) shown in the map as compared to the full 2D representation. Fewer points of interest shown in the map makes the map less cluttered and easier to read when traveling at higher speeds. A fifth speed range is satisfied when the speed of the personal navigation device 10 is greater than or equal to the fourth threshold Th4 but less than a fifth threshold Th5. In this case, the level of map detail can show a 2D map with a reduced number of colors used on the map. A simpler color scheme can make the map easier to read which is important when traveling at higher speeds. A sixth speed range is satisfied when the speed of the personal navigation device 10 is greater than or equal to the fifth threshold Th5 but less than a sixth threshold Th6. In this case, the level of map detail can show a 2D map with fewer streets shown. Fewer streets shown on the map makes the map easier to read and less cluttered. For example, the streets shown on the map can be restricted to the street that the user is currently driving on, side streets, and other major thoroughfares in the immediate area.

Because users may find frequent switching between 3D and 2D display modes distracting, preferences of the personal navigation device 10 can be set so that the display mode does not switch too frequently. For instance, a timer can be used for delaying changes from 2D to 3D mode unless the speed of the personal navigation device 10 has been below a certain level for over a predetermined period of time indicated by the timer.

Other settings may also be configured by the user, such as restricting the 3D mode to being used only when the user is carrying the personal navigation device 10 as a pedestrian, and using 2D mode when the personal navigation device 10 is installed in a vehicle. To help determine when the personal navigation device 10 is installed in a vehicle, the processor 20 can see if the cradle port 22 is connected to a cradle in the vehicle, or determine if the personal navigation device 10 is receiving external power as opposed to running off of an internal battery. If it is determined that the personal navigation device 10 is installed in a vehicle, the processor 20 can avoid showing maps in 3D mode if the user wishes to use this 2D mode setting while in the vehicle.

Figure 3:
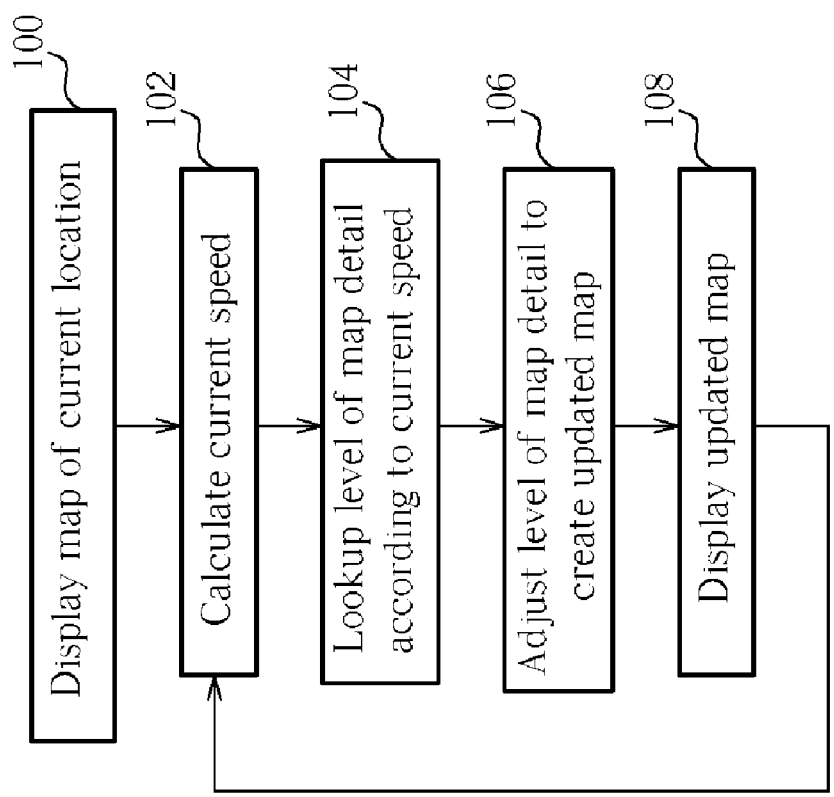
FIG. 3 is a flowchart illustrating the present invention method for adjusting the level of map detail using the personal navigation device.

Please refer to FIG. 3. FIG. 3 is a flowchart illustrating the present invention method for adjusting the level of map detail using the personal navigation device 10. Steps contained in the flowchart will be explained below.

Step 100: The display 12 of the personal navigation device 10 shows a map of the current location.

Step 102: The processor 20 calculates the current speed of the personal navigation device 10 based on location information received from the GPS receiver 18.

Step 104: The processor 20 consults the lookup table 36 for determining the appropriate level of map detail to show on the display 12 according to the calculated current speed of the personal navigation device 10.

Step 106: The processor 20 adjusts the level of map detail in order to create an updated map.

Step 108: The updated map is shown on the display 12. Go back to step 102 to continually adjust the level of map detail according to the speed of the personal navigation device 10.

It should be noted that the embodiments and settings of the personal navigation device 10 disclosed above are for illustrative purposes only, and should not be construed as limitations of the present invention. Any method of adjusting the level of map detail shown on the personal navigation device 10 according to the speed at which the personal navigation device 10 is moving is within the scope of the present invention. In this way, the present invention shows a level of map detail that is appropriate for the way that the personal navigation device 10 is being used.

Those skilled in the art will readily observe that numerous modifications and alterations of the device and method may be made while retaining the teachings of the invention.

What is claimed is:

1. A method of adjusting a level of map detail for content displayed on a personal navigation device, the method comprising:

displaying a map of a current location of the personal navigation device on a display of the personal navigation device;

calculating a current speed of the personal navigation device;

adjusting a level of map detail according to the current speed of the personal navigation device to create an updated map, wherein adjusting the level of map detail comprises:
  comparing the current speed of the personal navigation device to one or more threshold levels;
  selecting the level of map detail according to the comparison result, wherein the level of map detail is shown in a full three-dimensional view when the current speed of the personal navigation device is less than a first threshold value, and the level of map detail is shown in a two-dimensional view when the current speed of the personal navigation device is greater than a second threshold value and less than a third threshold value; and
  creating the updated map according to the selected level of map detail; and
displaying the updated map on the display of the personal navigation device.

2. The method of claim 1, wherein as the speed of the personal navigation device increases, the level of map detail decreases.

3. The method of claim 1, wherein the level of map detail is shown in a three-dimensional view showing outlines of buildings when the current speed of the personal navigation device is greater than a fourth threshold value and less than a fifth threshold value.

4. The method of claim 1, wherein the level of map detail is shown in a two-dimensional view having reduced points of interest when the current speed of the personal navigation device is greater than a fourth threshold value and less than a fifth threshold value.

5. The method of claim 1, wherein the level of map detail is shown in a two-dimensional view having reduced color information when the current speed of the personal navigation device is greater than a fourth threshold value and less than a fifth threshold value.

6. The method of claim 1, wherein the level of map detail is shown in a two-dimensional view having reduced street information when the current speed of the personal navigation device is greater than a fourth threshold value and less than a fifth threshold value.

7. The method of claim 1 further comprising:
  determining that the personal navigation device is placed in a cradle; and
  adjusting the level of map detail to create the updated map having a lower level of map detail in response to determining that the personal navigation device is placed in the cradle.

8. A personal navigation device for adjusting a level of map detail for content displayed on a personal navigation device, the personal navigation device comprising:
  a display for displaying a map of a current location of the personal navigation device;
  a Global Positioning System (GPS) receiver for receiving the current location of the personal navigation device;
  a memory for storing map data;
  a processor for calculating a current speed of the personal navigation device, adjusting a level of map detail according to the current speed of the personal navigation device to create an updated map, and controlling the display to display the updated map; and
  a lookup table storing one or more speed thresholds and their corresponding levels of map detail, wherein the processor compares the current speed of the personal navigation device to one or more threshold levels, selects the level of map detail according to the comparison result, and creates the updated map according to the selected level of map detail,
  wherein the level of map detail is shown in a full three-dimensional view when the current speed of the personal navigation device is less than a first threshold value, and the level of map detail is shown in a two-dimensional view when the current speed of the personal navigation device is greater than a second threshold value and less than a third threshold value.

9. The personal navigation device of claim 8, wherein as the speed of the personal navigation device increases, the level of map detail decreases.

10. The personal navigation device of claim 8, wherein the level of map detail is shown in a three-dimensional view showing outlines of buildings when the current speed of the personal navigation device is greater than a fourth threshold value and less than a fifth threshold value.

11. The personal navigation device of claim 8, wherein the level of map detail is shown in a two-dimensional view having reduced points of interest when the current speed of the personal navigation device is greater than a fourth threshold value and less than a fifth threshold value.

12. The personal navigation device of claim 8, wherein the level of map detail is shown in a two-dimensional view having reduced color information when the current speed of the personal navigation device is greater than a fourth threshold value and less than a fifth threshold value.

13. The personal navigation device of claim 8, wherein the level of map detail is shown in a two-dimensional view having reduced street information when the current speed of the personal navigation device is greater than a fourth threshold value and less than a fifth threshold value.

14. The personal navigation device of claim 8 further comprising a cradle port for connecting the personal navigation device to a docking cradle, wherein when the processor determines that the personal navigation device is placed in the cradle, the processor adjusts the level of map detail to create the updated map having a lower level of map detail.

* * * * *